XR 3,922,061

United States Patent [19]

Glass et al.

[11] 3,922,061

[45] Nov. 25, 1975

[54] OPTICAL STORAGE APPARATUS AND PROCESS

[75] Inventors: Alastair Malcolm Glass, Millington; Dietrich von der Linde, North Plainfield, both of N.J.

[73] Assignee: Bell Telephone Laboratories, Incorporated, Murray Hill, N.J.

[22] Filed: June 10, 1974

[21] Appl. No.: 477,836

[52] U.S. Cl. .................................. 350/3.5; 307/88.3

[51] Int. Cl.² ........................ G03H 1/02; G03H 1/04

[58] Field of Search ....... 350/3.5, 162 SF; 307/88.3; 340/173 LT

[56] References Cited

UNITED STATES PATENTS

| | | | |
|---|---|---|---|
| 3,444,316 | 5/1969 | Gerritsen | 350/3.5 |
| 3,530,442 | 9/1970 | Collier et al. | 350/3.5 |
| 3,703,328 | 11/1972 | Glass et al. | 350/3.5 |
| 3,770,336 | 11/1973 | Roess | 350/3.5 |
| 3,779,631 | 12/1973 | Shupe | 350/3.5 |

OTHER PUBLICATIONS

Firester, Jour. of Applied Physics, Vol. 40, No. 12, Nov. 1969, pp. 4849–4853.

*Primary Examiner*—Ronald J. Stern
*Attorney, Agent, or Firm*—G. S. Indig

[57] ABSTRACT

Holographic apparatus utilizes a multiphoton process for writing and single photon for reading. Dependence upon a virtual first photon absorption rather than an actual absorption for the information-containing radiation with reading accomplished at the same energy avoids unwanted erasure during readout while preserving the versatility of optical erasure (by multiphoton absorption). In a preferred embodiment, the apparatus is adapted for recording of multiple images superimposed within a three-dimensional medium. Typical media are ferroelectric with information storage taking the form of local changes in refractive index due to a corresponding change in electronic configuration.

14 Claims, 1 Drawing Figure

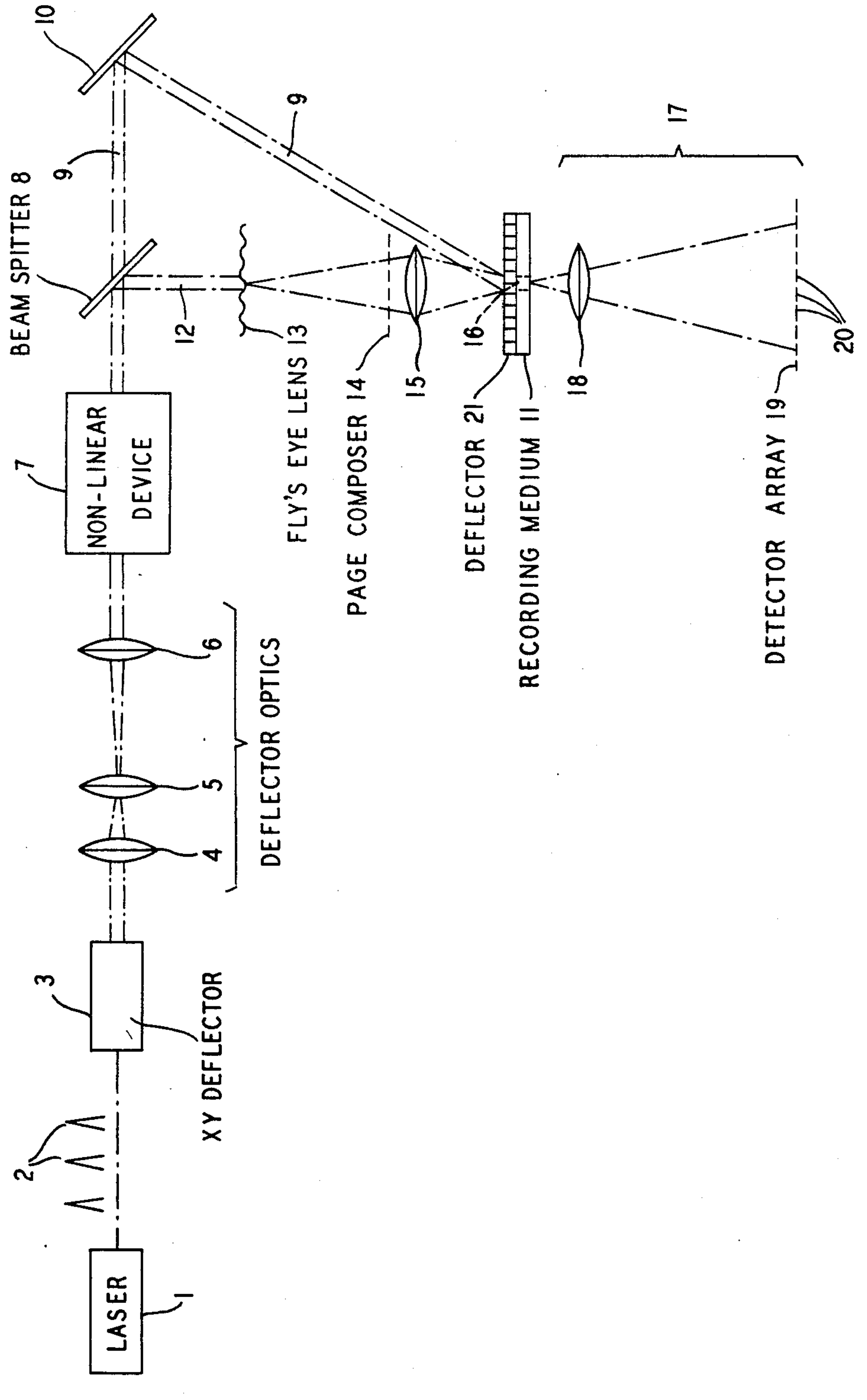
LASER
XY DEFLECTOR
DEFLECTOR OPTICS
NON-LINEAR DEVICE
BEAM SPITTER 8
FLY'S EYE LENS 13
PAGE COMPOSER 14
DEFLECTOR 21
RECORDING MEDIUM 11
DETECTOR ARRAY 19

OPTICAL STORAGE APPARATUS AND PROCESS

BACKGROUND OF THE INVENTION

1. Field of the Invention

The invention is concerned with apparatus for optical storage and readout. Holographic, and particularly volume holographic, arrangements are exemplary.

2. Description of the Prior Art

Development of a veriety of optical memory systems has been stimulated by introduction and advances in laser technology. Systems under consideration my be digital or analog, may use any of a variety of imaging techniques, such as pictorial or holographic, and may depend on absorption or index change either in transmission or reflection.

An approach which has received considerable attention recently is based on a change in refractive index which is introduced in a polar medium by electronic absorption. Local index change, generally viewed by transmission, accompanies a local variation in electric polarization.

A particularly promising medium depends on a matrix of lithium niobate which contains both divalent and trivalent iron ions. Electron transfer, as between the two iron species with $Fe^{2+}$ being converted to $Fe^{3+}$ at positions of greatest light intensity, is responsible for the change in polarization providing for storage. Utilized as a volume holograph medium, with access to different holograms by using different angles of incidence of interrograting beams, feasibility of storage of as high as $10^9$ bits per cu. cm. has been demonstrated; see 19, Applied Physics Letters 130 (1971). Use of this charge transfer mechanism in this medium has resulted in holographic diffraction efficiencies of a few percent with power levels of about 1 joule/cm$^2$.

An inherent advantage of imaging using media of the type described is optical erasure. Flooding, or scanning with unmodulated radiation of the energy used for writing, restores a random distribution of $Fe^{2+}$–$Fe^{3+}$ species. This facility suggests an inherent deficiency in the system. It is unavoidable that reading, which in a volume hologram is necessarily carried out with light of the wavelength used for writing, results in some eroding of the image. While this deterioration may be tolerable for low intensity short time access, use of higher intensity interrogating beams and/or of multiple interrogation may result in significant image degradation.

A technique for avoiding inadvertent erasure is described in 11, Applied Optics 390 (1972). This technique "fixes" the image, perhaps by thermal means. While appropriate for some uses, the advantage of optical erasure is lost.

SUMMARY OF THE INVENTION

Switching and/or memory apparatus adapted to optical writing and interrogating depends on a polarizable medium, such as, a poled ferroelectric material. Information is stored in the form of local changes in refractive index with such change greatest in regions of greatest incident light intensity.

The record function is primarily dependent on a two-photon mechanism with the first photon level representing a virtual, rather than a real, absorption. The second photon, when added to the first, is sufficient to bring the integrated quantum energy to or above the threshold for the conduction band (the lower edge of the upper absorption). While a variety of embodiments are presented, an exemplary form may utilize a relatively low energy first photon, for example, at an infrared wavelength, with such photon energy carrying the information to be stored. The second photon may be of a different, perhaps a higher, energy and, for illustration in one embodiment, may be the second harmonic of the information carrying energy.

Interrogation of the recorded information is a one photon process. In a preferred embodiment, the interrogating energy is a beam of the same photon energy or wavelength as the information containing energy during recording. Where the photon energies differ during recording, readout or interrogation is accomplished with no significant possibility of erasure (particularly where a two photon process utilizing the lower energy information-containing photons is insufficient to span the bandgap of the recording medium). Even for a nonpreferred embodiment, with index modification being a quadratic function of beam intensity, unwanted erasure is minimized simply by utilizing moderate rear intensities.

Functionally, the inventive approach permits recording with a light-only input and interrogation without erasure. Erasure is, however, readily accomplished, either locally or generally, by noninformation beams, again, operating on the two photon principle or even by use of short wavelength energy sufficient to directly excite into the conduction band.

It is the nature of the invention that it is amenable to a variety of switching and memory forms. These include the use of digital, as well as analog, information. An area of particular interest at this time involves holography, and the inventive medium has the capability of attaining the bit densities which constitute a major basis for interest in this approach. It is well known that the redundancy inherent in holography permits *a* very large bit density in a so-called "volume hologram" —i.e., in a bulk material in which different interference patterns are recorded within the same volume of the medium by using different angles of incidence of the writing and reading beams. Volume holography techniques are described in the scientific literature—see, for example, IEEE Spectrum, February 1973 at page 26 et seq.; and, also, 24 Applied Physics Letters, 130 (1974). For the usual holographic embodiment of the invention the first photon energy is that of an interference pattern produced in conventional fashion by interference of two beams of the same (first photon) energy. The second photon is introduced in the form of an unmodulated beam usually with one of the interfering beams.

Writing being accomplished primarily by a two photon process, the intensity of the recorded image is a quadratic function of the intensity of the cumulative incoming radiation. Certain of the described work depends on very high intensity short pulse length mode locked laser output for writing. Q-switched lasers are included among alternative energy sources. Typical writing intensities may attain levels of 500 megawatts per square centimeter and higher with total integrated pulse time of the order of a millisecond or less. At such levels, and for many materials, the energy sensitivity of the medium is actually improved over that for the prior art linear (single photon) process.

Both reading and writing are expedited as single photon level absorption is decreased. An essentially perfect multiphoton process in materials otherwise of optical quality results in a very favorable signal-to-noise ratio.

BRIEF DESCRIPTION OF THE DRAWING

The FIGURE is a schematic view of a form of apparatus in accordance with the invention.

DETAILED DESCRIPTION

1. The Drawing

The depicted apparatus utilizes a coherent light source, such as a mode locked laser 1, yielding pulse train 2 which is induced into a spatial deflector system, such as X, Y deflector system 3. Lens system, represented by elements, 4, 5, and 6, collimate, focus, and/or deflect the output of spatial deflector 3 so as to keep the pulse train within the desired confines. Nonlinear device 7, which may be a second harmonic generator or parametic oscillator, shown in phantom, converts some part of the output of laser 1 to a different photon energy. Such a device 7 constructed, for example, of KDP, Potassium dihydrogen Phosphate, may convert a portion of the 1.06 $\mu$m output of a neodymium output glass laser 1 to a wavelength of 0.53 $\mu$m. The pulse train, upon passing through nonlinear device 7, if such is present, may now contain two components. This composite stream is then made incident on partially reflecting mirror 8 which passes the portion of the incident energy and reflects a portion. In the illustrative embodiment shown, mirror 8 may either pass a fraction of the total energy without wavelength discrimination or, alternatively, and in a preferred embodiment, may pass both components but reflect primarily one (for the illustrative case recited, only the 1.06 $\mu$m component). The transmitted pulse train 9 is then reflected by mirror 10 so as to be directed to recording medium 11. Pulse train 12, which, in the preferred embodiment as illustrated, consists largely of 1.06 $\mu$m energy, may be passed through a spreading element, such as a fly's eye lens 13, from which it is directed to a representation of the information to be stored, in this instance, shown for illustration, as a transparent page composer 14. Lens system depicted as single element 15 then focuses the transmitted light so as to direct it to the desired restricted region 16 in recording medium 11. The illustrative apparatus is designed to operate as a holographic store so that information stored is in the form of an interference pattern resulting from interaction between the focused information carrying beam at 16 together with beam 9.

The depicted apparatus includes readout apparatus 17, which consists of a lens system represented by element 18, together with a detector array 19. Array 19 may be composed of a series of individual silicon avalanche detectors 20. In the read function, interrogation is carried out utilizing only a noninformation containing beam 9 as depicted. In a preferred embodiment, however, the apparatus is so arranged that beam 9, or its equivalent, consists of light of a wavelength corresponding with the information containing wavelength utilized in writing. For the illustrative embodiment utilizing a glass neodymium laser and a second harmonic generator (for writing), interrogation might utilize a 1.06 $\mu$m interrogating beam.

The most significant near term use for the described apparatus is for thick or volume holographic recording, i.e., holographic recording in which advantage is taken of the inherent redundancy of holography to permit recording of different images within the same volume of the medium. The apparatus depicted has sufficient facility for recording within selected restrictive regions on the recording medium. For such "thick" holograms, it is a requirement that reading be carried out at the same wavelength as that used for writing—that is, for the information carrying beam. For thin holograms, that is, for recording media of a layer thickness of the order of one or a few wavelengths, the wavelength of the interrogating beam is less significant.

Volume holography is described in some detail in 46, Bell System Technical Journal, 957 (1967) and 6, Journal of Quantum Electronics, 223 (1970). With certain obvious exceptions, the principles there described are applicable to the invention apparatus.

The arrangement shown depends upon spatial deflector element 3 for addressing individual recording regions. The result is to divide the recording medium 16 into a grid corresponding with individual recording regions. The appropriate recording or interrogation angle is obtained by means of deflector 21. Principle of operation of the deflector elements 3, 21 may be mechanical, acoustooptic, electrooptic, or magnetooptic. It has been shown that at least 100 super-imposed holographic images can be recorded and subsequently read out by appropriate angle selection without appreciable crosstalk. Present technology permits attainment of a grid of about $10^4$ regions of dimensions 0.1 cm x 0.1 cm on a plane of approximately 10 cm x 10 cm; so that the system depicted, in principle, is capable of providing $10^6$ individual holograms, each hologram having a memory capacity of about $10^6$ bits, so the system depicted is capable of storing about $10^{12}$ information bits. A lower bit density may, of course, be attained with a simple digital arrangement which provides only for coincidence of the two beams. For a binary system, the informationcontaining beam might simply take the form of a pulse train with selected pulses omitted.

2. Composition

The phenomenon on which the invention is based gives rise to certain inherent material requirements. Since, for example, recording is in the form of a local change in refractive index which may be regarded as the creation or alteration in a local electrical polarization and since this gives rise to a birefringence which is reciprocal, it is a first requirement that the material of which the recording medium is composed be electrically polarizable. Typical, in fact, preferred materials are capable of attaining the ferroelectric state; although it is sometimes desirable, even then, to utilize such a material in its paraelectric state (somewhat above the ferroelectric Curie point) with dipole orientation being induced by an imposition of an external electric field. Basically, the requirements are identical to those for a high linear electrooptic interaction. This requirement may be expressed in the terms of the equation:

$$\Delta n = \frac{n^3}{2} r \Delta E ,$$

in which $\Delta n$ is the change in refractive index; $n$ is the index of refraction as unmodulated—i.e., the index as measured in the transmission direction for the material in its natural state; $r$ is the electrooptic coefficient; (this term has units of inverse electric field—e.g., meters/-volt); and ΔE is the electric E-field in the medium due to either the polarization change created by the light or an externally applied field. An electrooptic effect may occur in a material which, in principle, is not capable of producing a linear electrooptic effect. By definition, any electrooptic effect in such a material must be due to a higher order term. In general, useful materials in this category rely on the second order or quadratic term. These are exemplified by materials which, while they may spontaneously polarize under some set of conditions, are maintained above their ferroelectric Curie point so that they are properly characterized as paraelectric. Materials manifesting a strong electrooptic interaction, based on the quadratic relationship, have been studied for possible use in a variety of devices. This class is exemplified by the mixed crystal of potassium-tantalate-niobate ($KTa_xHb_{1-x}O_3$ with $x$ being within the range of from 0.56 to 0.68 for room temperature operation) and by strontium-barium-niobate. Example 4 in this description is based on use of one such material. Many first order and second order term electrooptic materials are known. See The Handbook of Lasers, Chemical Rubber Co. All such materials and other yielding electrooptic coefficients are of at least $10^{-12}$ meters per volt (of course, including the quadratic materials which, for whatever reason, yield the same refractive index change) are suitable for use in the practice of the invention.

Other material requirements, while not responsible for the inventive effect, are of practical significance from a design standpoint. So, for example, the desire to operate with relatively small insertion loss—of particular importance for a volume, or more generally, thick recording medium, such as, a volume hologram—gives rise to a transparency requirement. While this requirement depends on the precise operating mode, for example, on the needed redundancy to permit the desired number of recorded levels, it is generally desirable to utilize materials in which the absorption length is at least 0.1 cm—i.e., the $1/e$th of the incident energy passes through 0.1 cm distance of the medium. Such a transparency, as measured for radiation of any wavelength of concern, either during writing or reading, is permitted in media useful for the practice of the invention, since the phenomenon is dependent on a virtual, rather than a real, absorption at the first photon level. The absorption distance limit is then more properly considered as a total permitted insertion loss so that lost energy may be absorbed or scattered. In principle, elimination of first photon damage centers, as described in The Journal of the American Ceramic Society, 56, 278 (1973), lessens both absorption and diffraction and, therefore, results in improved image acuity.

Some exemplary materials suitable for the practice of the invention are set forth in tabular form below:

| Compositions | Electrooptic Coefficient-meters/volt (r or equiv.) |
|---|---|
| $LiNbO_3$ | $32\times10^{-12}$ |
| $LiTaO_3$ | $30\times10^{-12}$ |
| KTN | $450\times10^{-12}$ |
| KDP | $10\times10^{-12}$ |
| $LiIO_3$ | $6.4\times10^{-12}$ |
| $Sr_{0.75}Ba_{0.25}Nb_2O_6$ | $1340\times10^{-12}$ |
| ZnO | $2.6\times10^{-12}$ |
| ZnS | $1.8\times10^{-12}$ |
| $Ba_2NaNb_5O_{15}$ | $57\times10^{-12}$ |

Materials investigated all have upper absorption edges at about 30,000 $cm^{+1}$ ± 10,000 $cm^{+1}$. It is, of course, implicit that materials be of satisfactory optical perfection and this, in turn, depends upon the needed thickness in the transmission direction. In gereral, materials do not have domain or phase boundaries so that most are single crystalline. Use of an inorganic or organic medium, which may or may not be a true glass, may be appropriate. A non-linear organic material which may be polarized to meet the requirements of the invention is polyvinylidene fluoride.

3. Processing

Preparation of materials suitable for this use are conventional. Depending upon the nature of the material, growth may be by deposition from the vapor phase (e.g., sputtering, evaporation, CVD), by bulk process, such as, by melt growth (Czochralski), from flux, etc.

The operating requirement of net macroscale polarization is met in a poled ferroelectric. Conventional poling carried out generally by use of an applied electric field maintained during cooling of a material through its Curie point to some lower temperature is described in Ferroelectrics, 4, 189 (1972). The polarization requirement is otherwise met by use of an external influence, e.g., in a paraelectric material by an applied electric field, in a piezoelectric non-pyroelectric by stress, etc. Polyvinylidene fluoride must be oriented perhaps by biaxial stressing and/or application of a field—see Japanese Journal of Applied Physics, 8, 975 (1969). Other dipole orientation mechanisms may be peculiarly adaptable to particular materials and are well known.

4. Mechanism

The nature of the mechanism responsible for the record function is a "damage mechanism" in the sense that dependence is had on local induced index inhomogeneities due, in turn, to induced electric fields or changes in electronic dipolar configuration. Unlike the usual damage mechanism, released electrons are from the homogeneous host material rather than from dopant. Experimental verification of two photon absorption across the bandgap arises from establishment of the quadratic relationship between diffraction efficiency and incident light intensity. Other experiments have established the mechanism to be consistent with the two photon virtual absorption mechanism. Diffraction efficiency, as measured with an elementary unmodulated hologram, is, within experimental error, identical for the undoped high transparent preferred material and for material which has been deliberately doped with sufficient $Cu^{2+}$ or $Fe^{2+}$ to account for the observed results on the basis of a second photon (real absorption) mechanism.

It has been observed that the inventive device is capable of a photo-refractive sensitivity significantly greater than that obtainable by single photon effect. This comparison is valid, both as respects materials deliberately doped with absorbing centers (e.g., $Fe^{2+}$ doped $LiNbO_3$) utilizing single photon 1.06 μm emission and undoped material in which writing is accomplished by single photon using high frequency radiation corresponding with the bandgap energy. This latter comparison—perhaps both comparisons—to some extend results from the larger insertion loss both during writing and reading due to the lessened transparency for the concerned wavelengths utilizing the single photon process.

5. Examples

The following examples were all conducted utilizing a mode-locked neodymium glass laser. Under the conditions of operation, total output during one burst was a train of approximately eighty pulses at a fundamental wavelength of 1.06 $\mu$m. In all of the experiments, use was made of similar pulses partially converted to a wavelength of 0.53 $\mu$m. This was accomplished by means of a conventional KDP non-linear second harmonic generator (SHG). Conversion efficiency for the very high peak intensity resulting from the oscillator arrangement used tended to be in the range of from 25 to 50 percent.

After passing through the SHG, processing consisted of splitting the beam into two portions—one of which served as a reference beam, the other of which served as the writing beam. In each instance, beam splitting was so arranged that second harmonic was retained in at least one of the two beams. Variations included arrangements in which 0.53 $\mu$m was contained in both beams and in which 1.06 $\mu$m was contained in both beams. The writing function was in the manner of usual holography with an interference pattern being produced within the holographic medium. While not explicitly specified, each example was so conducted so that recording was carried out at different angles. Variations noted in the examples include the composition of the holographic medium, the incident intensity, the integrated energy, and diffraction efficiency. In each instance, reading was by use of a beam of wavelength corresponding with that wavelength common to the writing and reference beams—i.e., identical to that of wavelength used for creating the diffraction pattern.

| Example | Composition of Holographic Medium | Incident Integrated Energy Joules/cm² 0.53$\mu$m | 1.06$\mu$m | Incident Peak Intensity Megawatt/cm² Ref. Beam 0.53$\mu$m | 1.06$\mu$m | Writing Beam 0.53$\mu$m | 1.06$\mu$m | Diffraction Efficiency Percent |
|---|---|---|---|---|---|---|---|---|
| 1 | $LiNbO_3$ absorption length 10cm at 0.53$\mu$m | 0.4 | 0 | 500 | 0 | 500 | 0 | 25 |
| 2 | $LiNbO_3$ absorption length 10cm at 0.53$\mu$m | 0.1 | 2 | 125 | 1000 | 0 | 1000 | 25 |
| 3 | $LiTaO_3$ absorption length 3cm at 0.53$\mu$m | 0.4 | 0 | 500 | 0 | 500 | 0 | 20 |
| 4 | KTN absorption length 10cm at 0.53$\mu$m electric field 7000V/cm | 0.0001 | 0 | 10 | 0 | 10 | 0 | 10 |
| 5 | KTN absorption length 10cm at 0.53$\mu$m electric field 7000V/cm | 0.00035 | 1 | 0.4 | 500 | 0 | 500 | 10 |

In each example, the holographic medium was of a thickness of about 2 mm in the transmission direction. Examples set forth were selected from a large body of experiments. To reuse holographic media, holograms were necessarily erased between experiments. This was expediently accomplished by means of a single beam, generally containing the same components as those utilized during writing. So, for example, where writing was accomplished by use of a two photon effect utilizing two equal photons corresponding with 0.53 $\mu$m wavelength, the erasing beam was pure 0.53 $\mu$m. Where both 1.06 and 0.53 $\mu$m was utilized during writing, the erasing beam contained both such components. In fact, either arrangement is satisfactory, and the difference in the nature of the erasing beam was simply due to the apparatus arrangement used during writing.

The final column on the table of examples, Diffraction Efficiency Percent, was a measurement made during readout utilizing a beam corresponding to the reference beam in angle but of single wavelength corresponding with that wavelength utilized common to both beams during writing. The numbers in this column are a direct measure of the intensity and the diffracted beam divided by the intensity in the interrogating beam.

6. Other Considerations

The main impact of the invention is expected in volume holography. Volume holography is considered appealing because many images may be recorded in the single position of the holographic medium. For any given apparatus, the number of images is dependent upon the angular selectivity for meeting the BRAGG conditions corresponding with each of the multiple images. It is reasonable to design apparatus with a capability of recording 100 images per position with presently available ancillary equipment. As an approximation, appropriate angular selectivity for this number of images may be expected with a holographic medium thickness of approximately 1 mm.

The general transparency desideratum, expressed as an absorption depth of 0.1 cm, corresponds with the medium thickness of 1 mm. The preferred value for such a configuration, one easily obtainable for pure two photon effect is an absorption depth of 0.1 cm.

Both absorption depths assume the preferred embodiment—volume holography with a large number of images per position. Where a lesser number of images may be sufficient so that the relaxed requirement for angular selectivity permits thinner crystalline sections, the absorption depth may be further decreased, perhaps to values as small as 0.01 cm. Transparency should not be considered as an inventive requirement but rather as a characterization permitted by the mechanism which, after all, relies on virtual, rather than real, absorption. Under certain circumstances, for example, for two-dimensional holography or other two-dimensional store, high transparency may not offer a significant advantage. Under such circumstances, absorption depth even less than 0.01 cm may be permissible.

It is implicit in the inventive teaching that useful total incident radiation intensity be large. This derives from the fact that the two photon absorption process, upon which the invention is based, is quadratically related to this parameter. For this reason, experimental use has been made of short duration, high peak intensity pulses for writing—such pulses as are obtainable from mode-locked or Q-switched lasers.

Laser structures reported in the literature and commonly available at this time may result in peak intensities of a gigawatt/cm$^2$ and higher, and such intensities are generally useful in the practice of the invention. Depending upon the nature of the holographic medium and on its absorption to whatever due, an upper limit may be imposed; this upper limit may be of the order of 10 or 100 gigawatts/cm$^2$. For many materials, lesser peak intensities are adequate for writing over reasonable time intervals. To this end, a minimum peak intensity of 1 megawatt/cm$^2$ is prescribed.

Diffraction efficiency depends not only on the probability of the two photon event upon which the invention depends, but also on the total number of such events. For lower peak intensities within the range prescribed and also for materials which inherently present small two photon absorption cross sections, the interval over which the writing energy is made incident on the medium may desirably be increased. For the apparatus generally contemplated for writing, this corresponds with the use of multiple pulses. The actual apparatus utilized in the experiments made use of a mode-locked laser which produced a pulse train of approximately eighty pulses. Total integrated energy under a set of conditions reasonably characterizing contemplated apparatus for peak intensity of 1 megawatt/cm$^2$ may total approximately 1 millijoule/cm$^2$. Under other circumstances, particularly for high efficiency materials, the required integrated energy may be 1 microjoule/cm$^2$ or less. Where longer time interval, i.e., a train of a larger number of pulses, may be acceptable, peak intensity may conceivably be decreased to levels perhaps as low as 10 kilowatts/cm$^2$.

While diffraction efficiency is a design parameter of consequence from a systems standpoint rather than solely from the standpoint of the apparatus which is the subject of this invention, it may generally be assumed that an efficiency of at least 1 percent is desirable. The ranges, both of peak intensity and integrated incident energy, are premised on this assumption.

What is claimed is:

1. Holographic storage apparatus comprising a body of electrically polarizable material together with writing means for introducing information into said medium and reading means for extracting such information, in which said writing means comprises first means for generating an information-containing beam of radiation incident on said medium at some angle and a second means for introducing a non-information-containing beam of radiation so that interference between beams produced by said first and second means within said medium said first and second means being such that resulting radiation in each means contains at least a component of the same wavelength producing a corresponding interfering radiation pattern within said medium thereby producing a variation in refractive index corresponding with such pattern within the said medium and in which the said reading means is modulated in accordance with such varying refractive index pattern, characterized in that the photon energy of the radiation produced by the said writing and reading means is within the bandgap of the said medium, in that the said writing means includes a third means for producing non-information-containing radiation on at least a portion of the said body upon which the beam of at least the said first means is incident, the radiation of the third means also being of a photon energy within the bandgap of the said medium but being sufficient such that when combined with the radiation of the said first means the total energy produced by multiple photon is sufficient to attain a level above the upper absorption edge of the said medium and in which the apparatus is such that total maximum multiple photon absorption corresponds with absorption of radiation produced by said first and second means in regions of peak intensity within the medium by an amount which significantly exceeds that attributable to any real absorption for photon energy of said first and second means.

2. Apparatus of claim 1 in which the said body has a thickness of at least 0.01 cm in the direction of the radiation produced by the said first means and in which the apparatus is provided with fourth means for varying the said angle so that multiple interfering radiation patterns may be produced within the same region of the said body.

3. Apparatus of claim 2 in which the said thickness is at least 0.1 cm.

4. Apparatus of claim 1 in which the said third means constitutes at least a part of the said second means.

5. Apparatus of claim 4 in which the said third means and the said second means are but a single means producing radiation of a single wavelength.

6. Apparatus of claim 1 in which the total peak intensity corresponding with the maximum intensity within the said interfering radiation pattern is at least 0.1 megawatt/cm$^2$.

7. Apparatus of claim 1 in which the integrated energy at a position within the said medium corresponding with the maximum intensity of the said interfering radiation pattern is 1 microjoule/cm$^2$.

8. Apparatus of claim 7 in which the said minimum integrated energy is 1 millijoule/cm$^2$.

9. Storage arrangement of claim 1 in which the means for providing a prescribed angle of incidence consists essentially of an angular deflector element juxtapositioned to the said crystal.

10. Arrangement of claim 9 in which the said deflector depends for its operation upon an acoustooptic interaction with the said beam.

11. Arrangement of claim 1 including $x$ and $y$ deflector elements for selectively irradiating discrete areas of the said crystal.

12. Arrangement of claim 11 in which the said deflectors depend for their operation upon an acoustooptic interaction.

13. Arrangement of claim 11 in which the said deflectors depend for their operation on an electrooptic interaction.

14. Arrangement of claim 13 in which the said deflectors depend for their operation on a magnetooptic interaction.

* * * * *

UNITED STATES PATENT AND TRADEMARK OFFICE
CERTIFICATE OF CORRECTION

PATENT NO. : 3,922,061

DATED : November 25, 1975

INVENTOR(S) : Alastair M. Glass and Dietrich von der Linde

It is certified that error appears in the above-identified patent and that said Letters Patent are hereby corrected as shown below:

Column 1, line 9, change "veriety" to --variety--. Column 1, line 57, change "interrogating" to --interrogation--. Column 3, line 16, change "parametic" to --parametric--. Column 4, line 34, change "informationcontaining" to --information-containing--. Column 5, line 66, change "$cm^{+1}$" first occurrence to --$cm^{-1}$--, "$cm^{+1}$" second occurrence to --$cm^{-1}$--.

Signed and Sealed this

Thirty-first Day of August 1976

[SEAL]

*Attest:*

RUTH C. MASON
*Attesting Officer*

C. MARSHALL DANN
*Commissioner of Patents and Trademarks*